W. L. BLISS.
SYSTEM OF ELECTRICAL DISTRIBUTION.
APPLICATION FILED AUG. 4, 1904.
904,925.
Patented Nov. 24, 1908.
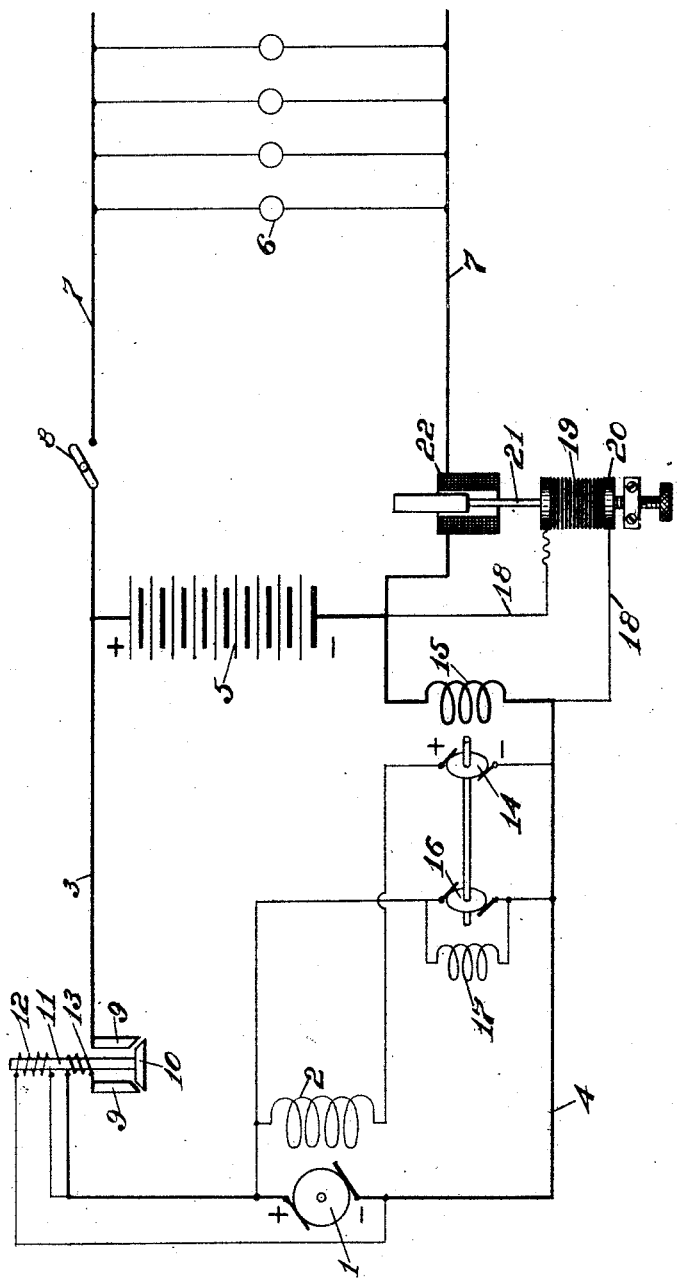
WITNESSES:
Herbert J. Smith
Edwin B. H. Tower, Jr.
INVENTOR
William L. Bliss
BY Jones & Addington
ATTORNEYS

UNITED STATES PATENT OFFICE.

WILLIAM L. BLISS, OF NEW YORK, N. Y.

SYSTEM OF ELECTRICAL DISTRIBUTION.

No. 904,925.   Specification of Letters Patent.   Patented Nov. 24, 1908.

Application filed August 4, 1904.   Serial No. 219,462.

*To all whom it may concern:*

Be it known that I, WILLIAM L. BLISS, a citizen of the United States, residing at New York, in the county of Kings and State of New York, have invented new and useful Improvements in Systems of Electrical Distribution, of which the following is a full, clear, concise, and exact description, reference being had to the accompanying drawing, forming a part of this specification.

My invention relates to improvements in systems of electrical distribution, and although it is particularly adapted for lighting cars or trains by electricity, it may be applied to other purposes.

In the lighting of cars by electricity, a system has been employed wherein the current for operating the lamps and other translating devices is furnished from a generator which derives its power from the motion of the car or train and a storage battery which receives its charging current from the generator, said generator being regulated by means of a suitable automatic regulator to confine the voltage developed thereby within certain limits, notwithstanding the excessive variations in the speed thereof.

The current which the generator must deliver to charge the battery besides operating the translating devices, depends upon the current being consumed by the translating devices. As the current consumed by the translating devices varies upon changing the number of translating devices in operation, the generator output must be varied when the number of translating devices in operation changes, so as to insure sufficient current being delivered to the battery to charge the same.

The object of the present invention is to provide a system of car lighting wherein the regulator will not interfere with the ability of the generator to vary its output upon variations in the demands for current by the translating devices.

In accordance with the present invention in its preferred form, the regulator has associated therewith means whereby the current from the generator controlling the operation thereof remains substantially constant at constant speed of the generator, notwithstanding the tendency of said current to vary when variations in the output of the generator are caused by variations in the demands for current by the translating devices. Said means may consist of a shunt circuit extending around the regulator, and a rheostat adapted to vary the resistance of said shunt when the current controlling the operation of said regulator tends to vary.

The generator may be regulated by a regulator of any form so far as the ultimate results are concerned. In the preferred form of the present invention, however, there may be provided for this purpose a counter electro-motive force device which introduces a counter electro-motive force into the field circuit of the generator to oppose the current tending to flow therethrough and thereby reduce the energizing current of said field as the speed of the generator increases. As this causes the field of the generator to be weakened as the speed of the generator rises, the output of the generator remains within certain and safe limits.

A system which will serve to illustrate the principal features of the present invention is illustrated in the accompanying drawings. Although a particular embodiment of the invention has been selected for the purpose of illustration it will be understood that the invention may be embodied in various other ways.

The system of car or train lighting illustrated in the drawings employs a generator having an armature 1 and a field 2, said armature being geared to an axle or in any other way arranged so as to derive its motion from the motion of the car or train. From this generator current is delivered through the supply circuit having mains 3 and 4 to the battery 5 connected in the battery circuit extending across said mains and the translating devices 6 which are preferably arranged in parallel in the translating circuit 7—7, said translating circuit preferably being controlled by a switch 8.

The supply circuit may be controlled by an automatic switch which may consist of stationary contacts 9, 9 and a movable contact 10 carried by a plunger 11, said plunger being operated by a solenoid 12 of fine wire connected in a shunt across the supply circuit. When the automatic switch is closed, a solenoid 13 of coarse wire connected in series with the switch contacts in the supply circuit supplements the action of the shunt solenoid to effect closer engagement between the switch contacts as the current flowing through the switch from the generator increases. The automatic switch is closed by the shunt solenoid when the generator runs at sufficient speed to develop a certain voltage, and when the switch is closed the series solenoid is energized. As long as the generator voltage remains in excess of the battery voltage, the series solenoid is energized by current from the generator, and then the two solenoids act conjointly in keeping the switch closed, but when the generator voltage falls below the battery voltage, the series solenoid becomes energized by current from the battery flowing backward therethrough, and then as the two solenoids oppose each other, due to the reversal of the polarity of the series solenoid, the switch opens and stops the discharge of the battery through the generator.

The generator may be regulated to confine the voltage developed thereby within safe and certain limits by a counter electromotive force device having an armature 14 connected in series with the field 2 of the generator and a field or controlling magnet 15 connected in the supply circuit, said armature preferably being driven in starting by a shunt wound motor connected across the mains of the supply circuit and having an armature 16 and a field 17.

When the generator becomes operative, the field 15 of the counter electro-motive force device becomes excited by current flowing through the supply circuit from the generator, and the armature 14 thereof runs at substantially constant speed, said armature having been started by the motor. The field strength of the counter electro-motive force device will increase as the voltage developed by the generator increases, and as this will cause the counter electro-motive force created in the field circuit of the generator to increase, the strength of the field of the generator will be decreased. As the field strength of the generator will thus be varied approximately inversely as the speed of the generator varies, the output of the generator will remain within certain and safe limits, notwithstanding the extent to which the speed of the generator may rise. Assuming that when the car runs at about 20 miles per hour the generator runs at 500 revolutions per minute and develops 64 volts, then when the car runs at about 60 miles per hour, the generator would run at about 1500 revolutions per minute, and if its field were not weakened by the counter electro-motive force device would develop about 192 volts. It is sufficient to have the generator develop 80 volts at the maximum speed of the car, as this will be approximately 2½ volts per cell, which is ample to force the full charging current through the battery, where the battery contains 32 cells each having a normal voltage of 2 volts. Accordingly, the generator is preferably regulated by the counter electro-motive force device to allow a variation in the voltage developed by the generator from 64 to 80 volts while the speed of the generator varies from about 500 revolutions per minute at a car speed of 20 miles per hour to 1500 revolutions per minute at a car speed of about 60 miles per hour.

Around the field or controlling magnet of the counter electro-motive force device may extend a shunt circuit 18, the resistance of which may be varied by a rheostat having a resistance composed of a series of disks 19 of carbon or other suitable material resting upon a stationary support 20. A plunger 21 operated by a magnet 22 may serve to vary the pressure between said disks and thus operate the rheostat to vary the resistance introduced thereby into the shunt.

The action of the counter electro-motive force device in regulating the generator will remain substantially constant while the generator runs at constant speed and the voltage developed thereby remains constant, even though the current delivered through the supply circuit to the translating devices varies, due to variations in the demand for current caused by changing the number of translating devices in use, as such variation in the current consumed by the translating devices will cause the rheostat to be operated to vary the resistance of the shunt circuit so as to vary the current being diverted from the counter electro-motive force device. If the current flowing from the generator to the translating devices increases, the rheostat will be operated to decrease the resistance of the shunt, and then such an increase will result in the current which is being diverted from the counter electro-motive force device, that the actual current controlling the operation of said device will remain substantially constant and the action of said device will be unaffected. Therefore, the counter electro-motive force device will not interfere with the ability of the generator to vary its output upon a variation in the demands for current by the translating devices, although it will regulate said generator to confine the voltage developed thereby within prearranged limits, notwithstanding the extent to which the voltage developed by the generator tends to increase, due to rise in the speed of the generator.

When the voltage impressed upon the battery by the generator increases above the normal voltage of the battery, a considerable increase will occur in the output of the generator, as the current delivered to the battery will increase in almost exact proportion to the increase in the voltage impressed thereon above the normal voltage thereof. As the increase in the output occurring under such conditions will cause an increase in the current flowing through the controlling magnet 15, the counter electro-motive force device will decrease the strength of the field of the generator. The field strength of the generator thus being decreased as the output of the generator tends to increase, the speed of the generator may vary extensively and still the output of the generator will remain within safe limits.

The current for charging the battery will remain substantially constant at constant speed of the generator, for when the demand for current by the translating devices varies, the output of the generator will vary accordingly, that is, assuming that the battery receives 15 amperes and the translating devices consume 20 amperes, thus making the total current delivered by the generator 35 amperes, then should the current being consumed by the translating devices increase to 35 amperes, the output of the generator would increase to 50 amperes, so as to leave 15 amperes for charging the battery.

An advantage which arises from maintaining constant current for charging the battery at constant speed of the generator, is that where the car or train runs upon a certain schedule, it is possible to insure sufficient current being delivered by the generator to the battery to compensate for all the demands which may be made upon the battery by the translating devices.

While the car is at rest, the translating devices may be operated by the battery 5, the circuit from said battery to the translating devices being completed from the positive terminal of the battery through the switch 8, conductor 7, translating devices 6, conductor 7, and magnet 22, to the negative terminal of the battery. When the car runs at sufficient speed to develop, for instance, 64 volts the automatic switch will be closed and then if the voltage developed by the generator and that of the storage battery are substantially equal, the generator and battery will coöperate in supplying the current for operating the translating devices, but if the voltage developed by the generator becomes higher than the voltage of the battery, the generator will supply current for charging the battery as well as for operating the translating devices.

In my Patent No. 799,526, of September 12th, 1905, I have illustrated a system embodying the features of the present invention as applied to a system for lighting trains of cars, said system being a modification of the present invention.

There are obviously many changes which may be made in the system illustrated in this application which will not in any way depart from the present invention and which will be within the purview of the claims appended hereto.

Having thus described my invention, what I claim as new and desire to secure by Letters Patent, is:—

1. In combination, a generator driven at a variable speed, translating devices connected thereto, a dynamo-electric machine for regulating said generator to confine the output thereof within prearranged limits, the field of said dynamo-electric machine being connected in circuit with said generator and said translating devices to control the regulation of said generator, and means preventing substantial variations in the current flowing through said field upon variations in the output of said generator resulting from variations in the demands for current.

2. In combination, a generator driven at a variable speed and having a regulating circuit, translating devices connected to said generator, a dynamo-electric machine for regulating said generator to confine the output thereof within prearranged limits, the armature of said dynamo-electric machine being connected in said regulating circuit to introduce a counter electromotive force therein, and the field thereof being connected in circuit with said generator and said translating devices to control the regulation of the generator, and means preventing the current flowing through said field from being substantially varied upon variations in the output of said generator resulting from variations in the demands for current by said translating devices.

3. In combination, a generator driven at a variable speed, a storage battery and translating devices, a circuit connecting said storage battery and said translating devices to said generator, an external regulator for automatically regulating said generator to confine the output thereof within prearranged limits, said regulator being provided with an electro-magnet controlling the operation thereof and connected in said circuit in series, a shunt-circuit extending around said electro-magnet and provided with a variable resistance, and means for varying said resistance upon variations in the current delivered to said translating devices.

4. In combination, a generator driven at a variable speed, a storage battery and translating devices, a circuit connecting said storage battery and said translating devices to said generator, a dynamo-electric machine for automatically regulating said generator to confine the output thereof within prearranged limits, the field of said dynamo-electric machine being connected in said circuit to control the regulation of the generator, a shunt-circuit extending around said field and provided with a variable resistance, and means for varying said resistance upon variations in the current delivered to the said translating devices.

5. In combination, a generator driven at a variable speed and having a regulating circuit, a storage battery and translating devices, a supply circuit connecting said storage battery and said translating devices to said generator, a dynamo-electric machine for automatically regulating said generator to confine the output thereof within prearranged limits, the armature of said dynamo-electric machine being connected in said regulating circuit to introduce a counter-electromotive force therein, and the field thereof being connected in the supply circuit in series to control the regulation of the generator, a shunt-circuit extending around said controlling magnet and provided with a variable resistance, and means for varying said resistance upon variations in the current delivered to the said translating devices.

6. In combination, a generator driven at a variable speed, a storage battery and translating devices, a circuit connecting said storage battery and said translating devices to said generator, an electro-magnet connected in said circuit in series and controlling the output of said generator, a shunt-circuit extending around said magnet and provided with a variable resistance, and means for preventing the current flowing through said controlling magnet from varying substantially upon variations in the output of the generator resulting from variations in the demands for current by said translating devices.

7. In combination, a generator, a storage battery and translating devices, a circuit connecting said storage battery and said translating devices to said generator, an external regulator for regulating said generator to confine the output thereof within prearranged limits, said regulator being provided with an electro-magnet controlling the operation thereof and connected in said circuit in series, and automatic means for preventing the current flowing through said magnet from varying substantially upon variations in the output of said generator resulting from variations in the demands for current by said translating devices.

8. In combination, a generator driven at a variable speed, a storage battery and translating devices, a supply circuit connecting said storage battery and said translating devices in circuit with said generator in parallel with each other, a regulator regulating said generator to confine the output thereof within prearranged limits, said regulator being provided with an electro-magnet connected in series in said supply circuit and controlling the operation of said regulator, a shunt-circuit extending around said electro-magnet and provided with a variable resistance, and an electro-magnet connected in the translating branch of said supply circuit and controlling said resistance.

9. In combination, a generator driven at a variable speed, a storage battery and translating devices, a supply circuit connecting said storage battery and said translating devices in circuit with said generator in parallel with each other, a dynamo-electric machine for automatically regulating said generator to confine the output thereof within prearranged limits, the field of said dynamo-electric machine being connected in said supply circuit in series with said storage battery and said translating devices to control the operation of said dynamo-electric machine, a shunt-circuit extending around said field and provided with a variable resistance, and an electro-magnet connected in the translating branch of said supply circuit and controlling said resistance.

10. In combination, a generator driven at a variable speed and having a regulating circuit, a storage battery and translating devices, a supply circuit connecting said storage battery and said translating devices in circuit with said generator in parallel with each other, a dynamo-electric machine for automatically regulating said generator to confine the output thereof within prearranged limits, the armature of said dynamo-electric machine being connected in said regulating circuit to introduce a counter electro-motive force therein and the field thereof being connected in said supply circuit in series with said translating devices and said storage batteries to control the regulation of said generator, a shunt-circuit extending around said field and provided with a variable resistance, and an electro-magnet connected in the translating branch of said supply circuit and controlling said variable resistance.

11. In combination, a generator driven at a variable speed and having a shunt-field, a storage battery and translating devices, a supply circuit connecting said storage battery and said translating devices in circuit with said generator in parallel with each other, a regulator for automatically regulating the strength of said shunt-field as the speed of said generator varies, said regulator being provided with an electro-magnet connected in said supply circuit in series with said storage batteries and said translating devices and controlling the operation of said regulator, a shunt-circuit extending around said magnet and provided with a variable resistance, and an electro-magnet connected in the translating branch of said supply circuit and controlling said resistance.

12. In combination, a generator driven at a variable speed, and having a shunt-field, a storage battery and translating devices, a supply circuit connecting said storage battery and said translating devices in circuit with said generator in parallel with each other, a dynamo-electric machine having the armature thereof connected in the shunt-field circuit to introduce a counter electromotive force therein and thus vary the strength of said shunt-field inversely as the speed of said generator varies, the field of said dynamo-electric machine being connected in said supply circuit in series with said storage batteries and said translating devices to control the regulation of said generator, a shunt-circuit extending around the field of said dynamo-electric machine and provided with a variable resistance, and an electro-magnet connected in the translating branch of said supply circuit and controlling said resistance.

13. In combination, a generator, a storage battery and translating devices, a supply circuit connecting said storage batteries and said translating devices to said generator in parallel with each other, an electro-magnet arranged in series in said supply circuit and controlling the output of said generator, a shunt-circuit extending around said electro-magnet and provided with a variable resistance, and an electro-magnet connected in the translating branch of said supply circuit and controlling said resistance.

14. In combination, a generator having a shunt-field, a storage battery and translating devices, a supply circuit connecting said storage battery and said translating devices to said generator in parallel with each other, a regulator for regulating said generator to confine the output thereof within prearranged limits, said regulator being provided with an electro-magnet controlling the operation thereof, a shunt-circuit extending around said electro-magnet, a variable resistance arranged in said shunt-circuit, and an electro-magnet connected in the translating branch of said supply circuit and controlling said resistance.

15. In combination, a generator tending to develop a variable voltage, a circuit extending from said generator, translating devices connected to said circuit, a counter electro-motive force device adapted to regulate said generator and having a field or controlling magnet connected in said circuit, a shunt circuit extending around said magnet, and a rheostat adapted to automatically vary the resistance of said shunt circuit upon variations in the output of said generator resulting from variations in the demands for current by said translating devices.

16. In combination, a generator tending to develop a variable voltage, a supply circuit connected thereto, a battery circuit containing a battery and a translating circuit containing translating devices connected to said supply circuit, a regulator adapted to regulate said generator and having a controlling magnet connected in said supply circuit, a shunt circuit extending around said magnet, and a rheostat adapted to vary the resistance of said shunt circuit and having an operating magnet connected in said translating circuit.

17. In combination, a generator tending to develop a variable voltage, a supply circuit connected thereto, a battery circuit containing a battery and a translating circuit containing translating devices connected to said supply circuit, a counter electro-motive force device adapted to regulate said generator and having a field or controlling magnet connected in said supply circuit, a shunt extending around said magnet, and a rheostat adapted to vary the resistance of said shunt and having an operating magnet connected in said translating circuit.

18. In combination, a generator tending to develop a variable voltage, a supply circuit connected thereto, a battery circuit containing a storage battery and a translating circuit containing translating devices connected to said supply circuit, a counter electro-motive force device having a field or controlling magnet connected in said supply circuit, a shunt extending around said magnet, and a rheostat adapted to automatically vary the resistance of said shunt.

19. In combination, a generator tending to impress a variable voltage, a supply circuit connected thereto, a battery circuit containing a storage battery and a translating circuit containing translating devices connected to said supply circuit, a counter electro-motive force device having a field or controlling magnet connected in said supply circuit and an armature connected in the field circuit of said generator, a shunt extending around said magnet, and a rheostat adapted to vary the resistance of said shunt and having an operating magnet connected in said translating circuit.

20. In combination, a generator tending to develop a variable voltage, a supply circuit connected thereto, a battery circuit containing a storage battery and a translating circuit containing translating devices connected to said supply circuit, a counter electro-motive force device having a field or controlling magnet connected in said supply circuit and an armature connected in the field circuit of said generator a motor adapted to operate said counter electro-motive force device, a shunt extending around said magnet, and a rheostat adapted to vary the resistance of said shunt and having an operating magnet connected to said translating circuit.

In witness whereof, I have hereunto subscribed my name in the presence of two witnesses.

WILLIAM L. BLISS.

Witnesses:
H. G. THOMPSON, Jr.,
EDWIN B. H. FLOWER, Jr.